(12) United States Patent
Liao et al.

(10) Patent No.: US 8,262,911 B2
(45) Date of Patent: Sep. 11, 2012

(54) METHOD FOR TREATMENT OF SLUDGE

(75) Inventors: Zhimin Liao, Shenzhen (CN);
Jianzhong Xiong, Shenzhen (CN);
Shengyun Yang, Shenzhen (CN); Jialin Zhou, Shenzhen (CN); Xingfu Jiang, Shenzhen (CN); Lingyun He, Shenzhen (CN); Qihu He, Shenzhen (CN); Dejin Ju, Shenzhen (CN); Aiguo Wan, Shenzhen (CN); Zhihua Yuan, Shenzhen (CN); Jiejun Cao, Shenzhen (CN); Kun Tao, Shenzhen (CN)

(73) Assignee: Jiangxi JDL Environmental Protection Research Ltd., Nanchang (CN)

( * ) Notice: Subject to any disclaimer, the term of this patent is extended or adjusted under 35 U.S.C. 154(b) by 256 days.

(21) Appl. No.: 12/552,558

(22) Filed: Sep. 2, 2009

(65) Prior Publication Data
US 2010/0288696 A1   Nov. 18, 2010

(30) Foreign Application Priority Data
May 15, 2009   (CN) .......................... 2009 1 0115351

(51) Int. Cl.
*C02F 3/00* (2006.01)
(52) U.S. Cl. ........ 210/620; 210/621; 210/622; 210/791; 210/797
(58) Field of Classification Search .......... 210/150–151, 210/620–622, 220, 791, 797
See application file for complete search history.

(56) References Cited

U.S. PATENT DOCUMENTS

| | | | | |
|---|---|---|---|---|
| 3,807,700 A * | 4/1974 | Kennedy | ........................ | 366/137 |
| 6,361,695 B1 * | 3/2002 | Husain et al. | .................. | 210/614 |
| 6,616,843 B1 * | 9/2003 | Behmann et al. | .............. | 210/605 |
| 6,984,325 B1 * | 1/2006 | Venable | ........................ | 210/621 |
| 7,396,453 B1 * | 7/2008 | Probst | ........................... | 210/150 |
| 7,625,484 B2 * | 12/2009 | Yamasaki et al. | .............. | 210/150 |
| 2008/0041783 A1 * | 2/2008 | Barnes | ........................... | 210/605 |

* cited by examiner

*Primary Examiner* — Chester Barry
(74) *Attorney, Agent, or Firm* — Matthias Scholl P.C.; Matthias Scholl

(57) ABSTRACT

A method for treatment of sludge with a facultative-organism-adapted membrane bioreactor by providing a sludge treatment system comprising a facultative digestion tank, a membrane module, an aeration system, a sludge pump, and a drainage pump, pumping sludge into the facultative digestion tank via the sludge pump and allowing for digestion, synchronously aerating and scouring the membrane module by the aeration system, pumping the sludge by the drainage pump and filtrating by the membrane module so that sludge and water are separated, and draining the water via the drainage pump. The method can digest sludge completely in the digestion tank, and solves problems existing in conventional sludge treatment methods such as large investment and high transportation cost, even achieves a subject of zero discharge of sludge.

20 Claims, 2 Drawing Sheets

METHOD FOR TREATMENT OF SLUDGE

CROSS-REFERENCE TO RELATED APPLICATIONS

Pursuant to 35 U.S.C. §119 and the Paris Convention Treaty, this application claims the benefit of Chinese Patent Application No. 200910115351.6 filed May. 15, 2009, the contents of which are incorporated herein by reference.

BACKGROUND OF THE INVENTION

1. Field of the Invention

The invention relates to a method for treatment of sludge, and more particularly to a method for treatment of sludge with a facultative membrane bioreactor.

2. Description of the Related Art

Currently, more than 50% of sewage treatment plants adopt aerobic activated sludge process to treat sewage. However, the process produces a large amount of excess sludge that has complicated components and does great harm to environment. Conventional methods for treating excess sludge mainly lie in that excess sludge is firstly dehydrated in a sewage plant and then packaged and transported for landfill, incineration, or composting and so on.

However, these conventional methods have disadvantages as below: (1) in order to make excess sludge dehydrated and transport the dehydrated excess sludge, the overall investment of sludge treatment system is large; (2) the relevant technology and equipment required for an incineration method are complicated, high energy consuming and high cost, and causes atmospheric pollution; (3) a sludge landfill method requires a high soil mechanics properties of sludge, a large area of space and high transportation cost, additionally, the method easily cause groundwater pollution and atmospheric pollution due to landfill smell; and (4) a composting method easily causes heavy metal pollution.

SUMMARY OF THE INVENTION

In view of the above-described problems, it is one objective of the invention to provide a method for treatment of sludge with a facultative membrane bioreactor that greatly reduces the yield of excess sludge.

To achieve the above objectives, in accordance with one embodiment of the invention, there is provided a method for treatment of sludge with a facultative membrane bioreactor that greatly reduces the yield of excess sludge, the method comprising the steps of:
a) providing a sludge treatment system comprising a facultative digestion tank, a membrane module, an aeration system, a sludge pump, and a drainage pump;
b) pumping sludge into the facultative digestion tank via the sludge pump and allowing for digestion;
c) synchronously aerating and scouring the membrane module by the aeration system;
d) pumping the sludge by the drainage pump and filtrating by the membrane module so that sludge and water are separated; and
e) draining the water via the drainage pump.

In a class of this embodiment, the facultative digestion tank provides reaction conditions for facultative or anaerobic digestion of sludge, and most area of the facultative digestion tank is maintained in a facultative or anaerobic state, the average concentration of dissolved oxygen being <1.0 mg/L. Facultative microbe is predominant in the facultative digestion tank.

The above-mentioned sludge digestion refers to the disintegration of excess sludge due to the endogenous respiration of microbe. The resultant organic compounds are completely decomposed into water, carbon dioxide, and inorganic salts in the presence of facultative or anaerobic microbe in the facultative digestion tank. The water and inorganic salts are drained out and the carbon dioxide becomes a part of the atmosphere.

In a class of this embodiment, the facultative digestion tank is made of reinforced concrete or steel.

In a class of this embodiment, the sludge is pumped by the sludge pump from a secondary sedimentation tank into the facultative digestion tank. An opening and closure of the sludge pump is controlled by a ball-float level indicator in the facultative digestion tank.

In a class of this embodiment, the membrane module is micro-filtration membrane module, the amount thereof is based on the amount of daily treated sludge, and the water yield thereof is equivalent to the amount of daily treated organic excess sludge.

In a class of this embodiment, the aeration system mainly provides air-water scouring against the membrane module so as to prevent sludge from depositing and polluting the membrane.

In a class of this embodiment, the aeration system is a blower aeration system.

In a class of this embodiment, the aeration system is a jet aeration system.

In a class of this embodiment, the blower aeration system comprises a blower, an air duct, an aeration pipe, an aeration branch pipe, and a perforated aeration tube. The perforated aeration tube is disposed below the membrane module. The blower is disposed out of the facultative digestion tank and connected to the perforated aeration tube via the air duct, the aeration pipe, and the aeration branch pipe, and provides air-water scouring against the membrane module, and an air-water ratio being 10-30:1.

In a class of this embodiment, the jet aeration system comprises a jet aerator, an air inlet, a water inlet, an outlet, an aeration pipe, an aeration branch pipe, and a perforated aeration tube. The jet aerator is disposed between the membrane modules or at the side of the membrane module. The air inlet is disposed above the liquid surface of the facultative digestion tank. The water inlet is disposed below the liquid surface of the facultative digestion tank. The outlet is connected to the perforated aeration tube via the aeration pipe and the aeration branch pipe.

When the jet aeration system works, a negative pressure is formed due to high speed of fluid flow in the jet aerator, and air is absorbed by the air inlet and forms a mixture having microbe with liquid and solid in the aeration pipe. The mixture is transported by the perforated aeration tube and scours against the membrane modules, and thereby a pollution of the membrane module is avoided.

In a class of this embodiment, the perforated aeration tube is disposed equidistantly below the membrane module, and connected to the blower or jet aerator via the aeration pipe, the aeration branch pipe and/or the air duct.

In a class of this embodiment, both ends of the aeration branch pipe are closed, and both sides are connected to the perforated aeration tube. A plurality of aeration holes is disposed on the perforated aeration tube. An angle between the aeration hole and vertical line is ±44°-46°; a diameter of the aeration hole is 4-10 mm; and a distance between two aeration holes is 100-300 mm.

In a class of this embodiment, the perforated aeration tube is disposed 100-500 mm below the bottom of the membrane module, and is composed of corrosion-resistant tubes.

Advantages of the invention are summarized below: the method can digest sludge completely in the digestion tank, and solves problems existing in conventional sludge treatment methods such as large investment and high transportation cost, even achieves a subject of zero discharge of sludge.

BRIEF DESCRIPTION OF THE DRAWINGS

The invention is described hereinbelow with reference to accompanying drawings, in which.

Figure 1:
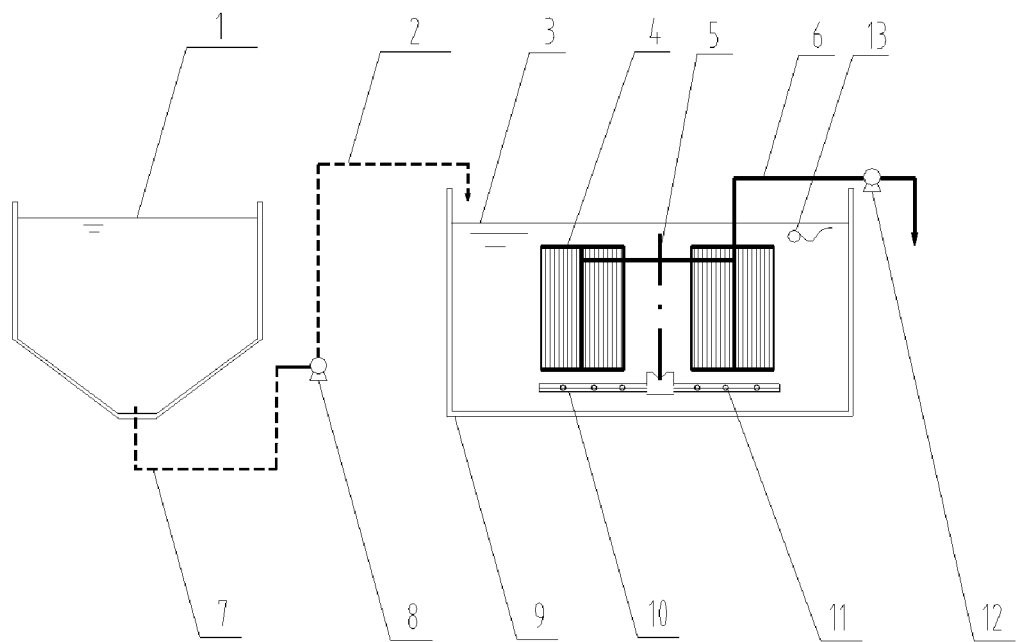
FIG. 1 is a flow chart of a method of treatment of sludge in accordance with one embodiment of the invention.
Figure 2:
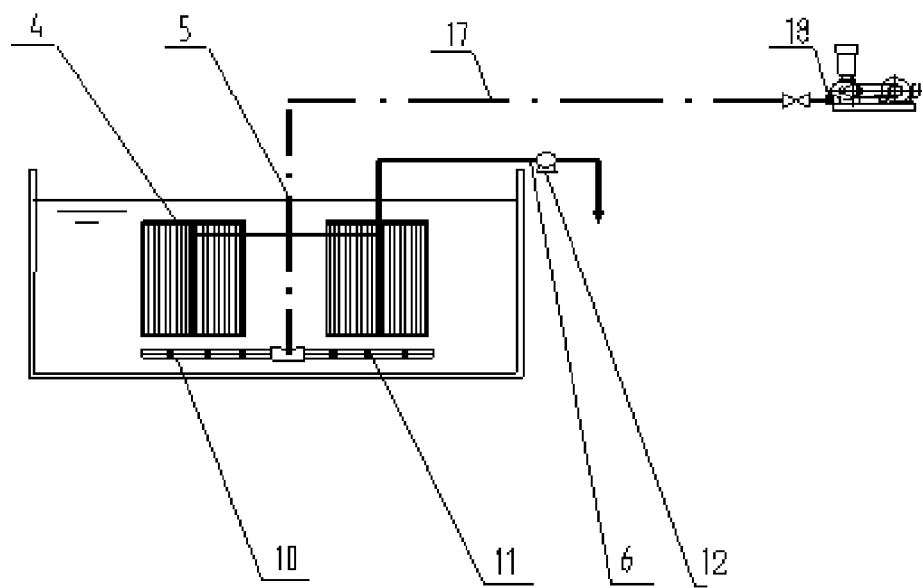
FIG. 2 is a schematic diagram of a blower aeration system in accordance with one embodiment of the invention.

Labels: 1. secondary sedimentation tank; 2. sludge outlet pipe; 3. liquid surface; 4. membrane module; 5. aeration pipe; 6. water outlet pipe; 7. sludge inlet pipe; 8. sludge pump; 9. facultative digestion tank; 10. aeration branch pipe; 11. perforated aeration tube; 12. drainage pump; 13. ball-float level indicator; 14. water inlet; 15. jet aerator; 16. air inlet; 17. air duct; 18. blower.

DETAILED DESCRIPTION OF THE EMBODIMENTS

For further illustrating the invention, embodiments detailing a method of treatment of sludge with a facultative membrane bioreactor are described below. It should be noted that the following embodiments are intended to describe but not to limit the invention.

Embodiment 1

As shown in FIGS. 1, 2, 3, and 4, a method of treatment of sludge with a facultative membrane bioreactor comprising providing a sludge treatment system comprising a facultative digestion tank 9, a membrane module 4, an aeration system, a sludge pump 8, and a drainage pump 12. The sludge pump 8 is connected to a secondary sedimentation tank 1 via a sludge inlet pipe 7 and connected to the facultative digestion tank 9 via a sludge outlet pipe 2. Sludge is pumped into the facultative digestion tank 9 and digested therein. Pumped by the drainage pump 12, the sludge is filtrated by the membrane module 4 and thereby sludge and water are separated, and the water is drained out. The opening and closure of the sludge pump 8 is controlled by a ball-float level indicator 13 in the facultative digestion tank 9. When the liquid surface 3 of the facultative digestion tank 9 is lower than a set value, the sludge pump 8 is initiated and pumps sludge into the facultative digestion tank 9. An aeration pipe 5 is connected to a jet aerator 15 or a blower 18. Air or a mixture comprising sludge, water, and air is sprayed into the facultative digestion tank 9 via a plurality of aeration holes of perforated aeration tube 11.

The perforated aeration tube 11 is disposed equidistantly right below the membrane module 4, one end thereof connected to the aeration branch pipe 10 and the other end closed. The aeration branch pipe 10 is connected to the aeration pipe 5 and both ends thereof are closed. The aeration pipe 5 is connected to the blower 18 via an air duct 17 or to the jet aerator 15 directly. A plurality of aeration holes are disposed at both sides of the perforated aeration tube 11, and an angle between the aeration hole and vertical line is ±45°. A diameter of the aeration hole is 4-10 mm. The perforated aeration tube 11 is disposed 300 mm below the bottom of the membrane module 4. A distance between two aeration holes is 200 mm.

The aeration system is a blower aeration system or a jet aeration system.

The blower aeration system comprises the blower 18, the air duct 17, and the aeration pipe 5. The blower 18 is connected to the aeration pipe 5 via the air duct 17.

The jet aeration system comprises the jet aerator 15 and affiliated pipes. The water inlet 14 of the jet aerator 15 is disposed below the liquid surface 3 of the facultative digestion tank 9. The air inlet 16 is disposed above the liquid surface 3 of the facultative digestion tank 9. The outlet of the jet aerator 15 is connected to the aeration branch pipe 10 via the aeration pipe 5.

In this embodiment, sludge is treated following the steps of:
a) pumping the sludge from the secondary sedimentation tank 1 into the facultative digestion tank 9 via the sludge inlet pipe 7, the sludge pump 8, and the sludge outlet pipe 2, and allowing for digestion;
b) synchronously aerating and scouring the membrane module 4 by the blower aeration system;
c) pumping the sludge by the drainage pump 12 and filtrating by the membrane module 4 so that sludge and water are separated; and
d) draining the water via the drainage pump 12.

In this embodiment, the aeration of the membrane module 4 is implemented by the blower 18. The blower 18 is connected to the perforated aeration tube 11 via the air duct 17, the aeration pipe 5, and the aeration branch pipe 10. Air or a mixture comprising of sludge, water, and air is sprayed into the facultative digestion tank 9 via a plurality of aeration holes of perforated aeration tube 11 and scours the membrane module 4.

Embodiment 2

Figure 3:
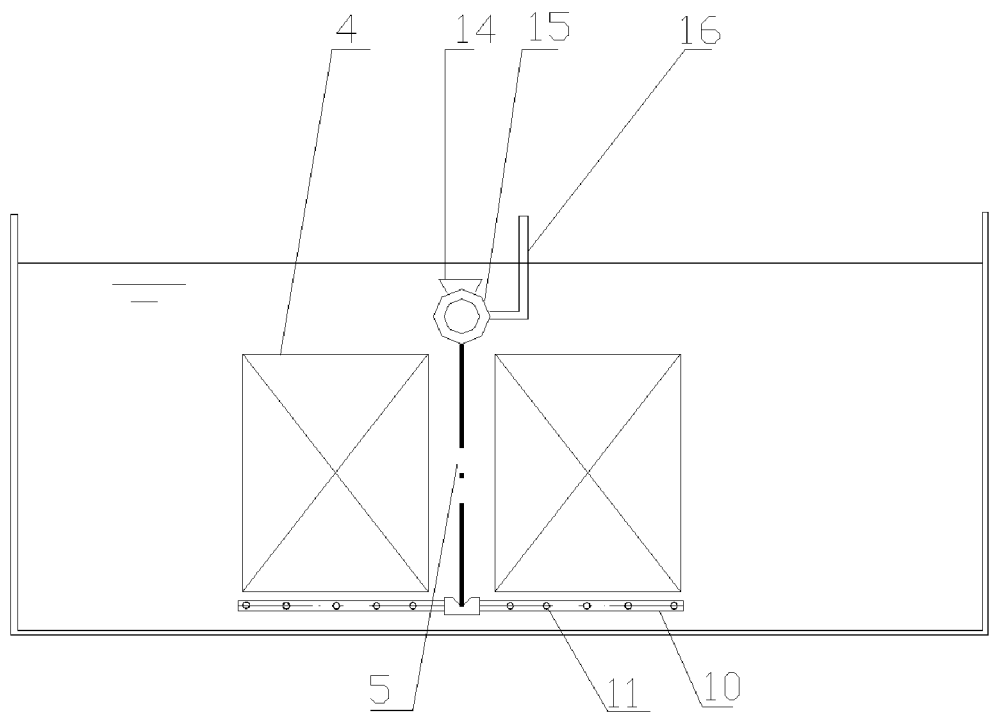
FIG. 3 is a schematic diagram of a jet aeration system in accordance with one embodiment of the invention.
Figure 4:
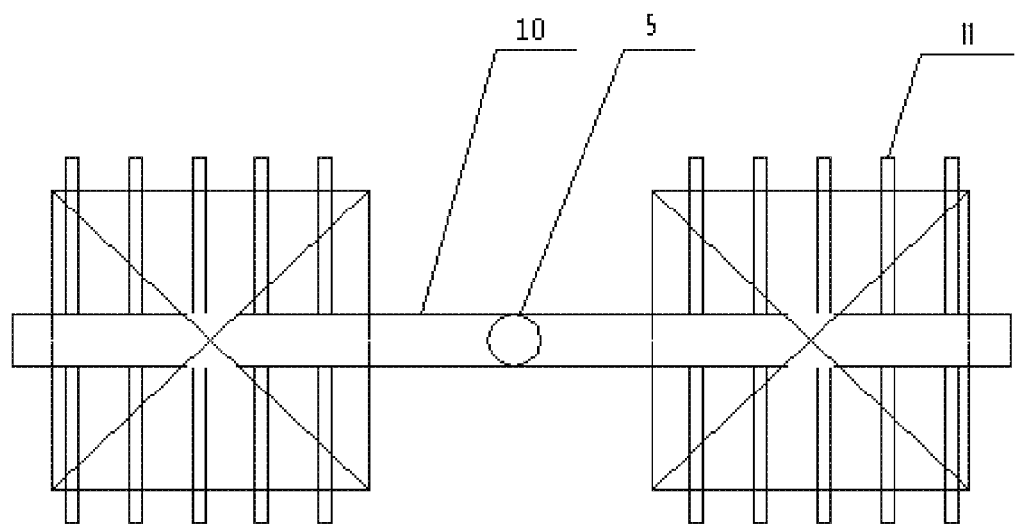
FIG. 4 is a top view of an aeration system in accordance with one embodiment of the invention.

As shown in FIG. 3, a jet aeration system for a method of treatment of sludge. The method is basically similar to Embodiment 1 except that a blower 18 is substituted with a jet aerator 15. An aeration pipe 5 is connected to the jet aerator 15 directly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for treatment of sludge, comprising
   a) providing a sludge treatment system comprising a facultative digestion tank, a membrane module, an aeration system, a sludge pump, and a drainage pump;
   b) pumping sludge into said facultative digestion tank via said sludge pump;
   c) synchronously aerating and scouring said membrane module by said aeration system;
   d) maintaining most of the area of said facultative digestion tank in a facultative or anaerobic state; maintaining an average concentration of dissovled oxygen in said facultative digestion tank at below 1.0 mg/L; and controlling facultative microbes to be predominant in said facultative digestion tank, thereby allowing for facultative digestion of said sludge to be conducted in said facultative digestion tank;
e) pumping said sludge by said drainage pump and filtrating by said membrane module so that said sludge and water are separated; and
f) draining said water via said drainage pump.

2. The method of claim 1, wherein an opening and closure of said sludge pump is controlled by a ball-float level indicator in said facultative digestion tank.

3. The method of claim 1, wherein said facultative digestion tank is made of reinforced concrete or steel.

4. The method of claim 1, wherein said membrane module is a micro-filtration membrane module, the amount thereof is based on the amount of daily treated sludge, and the water yield thereof is equivalent to the amount of daily treated organic excess sludge.

5. The method of claim 1, wherein said aeration system is a blower aeration system and provides air-water scouring against said membrane module.

6. The method of claim 1, wherein said aeration system is a jet aeration system and provides air-water scouring against said membrane module.

7. The method of claim 5, wherein said blower aeration system comprises a blower, an air duct, an aeration pipe, an aeration branch pipe, and a perforated aeration tube, said perforated aeration tube being disposed below said membrane module, said blower being disposed out of said facultative digestion tank and being connected to said perforated aeration tube via said air duct, and providing air-water scouring against said membrane module, and an air-water ratio being 10-30: 1.

8. The method of claim 5, wherein said perforated aeration tube is disposed equidistantly below said membrane module, and connected to said blower via said aeration branch pipe, said aeration pipe, and said air duct.

9. The method of claim 5, wherein one end of said perforated aeration tube is connected to said aeration branch pipe, the other end is closed; a plurality of aeration holes is disposed at both sides of said perforated aeration tube, and an angle between said aeration hole and vertical line is ±44°-46°; a diameter of said aeration hole is 4-10 mm; and a distance between two aeration holes is 100-300 mm.

10. The method of claim 6, wherein said jet aeration system comprises a jet aerator, an air inlet, a water inlet, an outlet, an aeration pipe, an aeration branch pipe, and a perforated aeration tube;
said jet aerator is disposed between said membrane modules or at the side of said membrane module;
said air inlet is disposed above the liquid surface of said facultative digestion tank;
said water inlet is disposed below the liquid surface of said facultative digestion tank; and
said outlet is connected to said perforated aeration tube via said aeration pipe and said aeration branch pipe.

11. The method of claim 10, wherein when said jet aeration system works, a negative pressure is formed due to high speed of fluid flow in said jet aerator, air is absorbed by said air inlet and forms a mixture having microbe with liquid and solid in said aeration pipe, said mixture is transported by said perforated aeration tube and scours against said membrane modules, and thereby a pollution of said membrane module is avoided.

12. The method of claim 10, wherein said perforated aeration tube is disposed equidistantly below said membrane module, and connected to said jet aerator via said aeration branch pipe.

13. The method of claim 10, wherein one end of said perforated aeration tube is connected to said aeration branch pipe, the other end is closed; a plurality of aeration holes is disposed at both sides of said perforated aeration tube, and an angle between said aeration hole and vertical line is ±44°-46°; a diameter of said aeration hole is 4-10 mm; and a distance between two aeration holes is 100-300 mm.

14. A method for treatment of sludge, comprising:
a) providing a sludge treatment system comprising a facultative digestion tank, a membrane module, a blower aeration system, a sludge pump, and a drainage pump;
b) pumping sludge into said facultative digestion tank via said sludge pump;
c) providing air-water scouring bubbles against said membrane module to synchronously aerate and scour said membrane module by said blower aeration system, wherein an air-water ratio of said air-water scouring bubbles is between 10 and 30 to 1;
d) maintaining most of the area of said facultative digestion tank in a facultative or anaerobic state, maintaining an average concentration of dissovled oxygen in said facultative digestion tank at below 1.0 mg/L, and controlling facultative microbes to be predominant in said facultative digestion tank, thereby allowing for facultative digestion of said sludge to be conducted in said facultative digestion tank;
e) pumping said sludge by said drainage pump and filtrating by said membrane module to separate sludge and water; and
f) draining said water via said drainage pump.

15. The method of claim 14, wherein said blower aeration system comprises a blower, an air duct, an aeration pipe, an aeration branch pipe, and a perforated aeration tube, said perforated aeration tube being disposed below said membrane module, said blower being disposed out of said facultative digestion tank and being connected to said perforated aeration tube via said air duct.

16. The method of claim 14, wherein said perforated aeration tube is disposed equidistantly below said membrane module, and connected to said blower via said aeration branch pipe, said aeration pipe, and said air duct.

17. The method of claim 14, wherein one end of said perforated aeration tube is connected to said aeration branch pipe, the other end is closed; a plurality of aeration holes is disposed at both sides of said perforated aeration tube, and an angle between said aeration hole and vertical line is ±44°-46°; a diameter of said aeration hole is between 4 and 10 mm; and a distance between two aeration holes is between 100 and 300 mm.

18. A method for treatment of sludge, comprising:
a) providing a sludge treatment system comprising a facultative digestion tank, a membrane module, a jet aeration system, a sludge pump, and a drainage pump; wherein said jet aeration system comprises a jet aerator, an air inlet, a water inlet, an outlet, an aeration pipe, an aeration branch pipe, and a perforated aeration tube; said jet aerator is disposed between said membrane modules or at the side of said membrane module; said air inlet is disposed above the liquid surface of said facultative digestion tank; said water inlet is disposed below the liquid surface of said facultative digestion tank; said perforated aeration tube is disposed equidistantly below said membrane module, and is connected to said outlet via said aeration pipe and said aeration branch pipe;
b) pumping sludge into said facultative digestion tank via said sludge pump;

c) synchronously aerating and scouring said membrane module by said jet aeration system;
d) maintaining most of the area of said facultative digestion tank in a facultative or anaerobic state, and maintaining an average concentration of dissovled oxygen in said facultative digestion tank at below 1.0 mg/L, controlling facultative microbes as being predominant in said facultative digestion tank, thereby allowing for facultative digestion of said sludge to be conducted in said facultative digestion tank;
e) pumping said sludge by said drainage pump and filtrating by said membrane module to separate said sludge and water; and
f) draining said water via said drainage pump.

19. The method of claim 18, wherein when said jet aeration system is turned on, a negative pressure is formed due to a high speed of fluid flow in said jet aerator, air is absorbed through said air inlet and forms a mixture of liquid and solid particles and microbes in said aeration pipe, said mixture is transported through said perforated aeration tube and scours against said membrane modules, and thereby avoiding polluting said membrane module.

20. The method of claim 18, wherein one end of said perforated aeration tube is connected to said aeration branch pipe, the other end is closed; a plurality of aeration holes is disposed at both sides of said perforated aeration tube, and an angle between said aeration hole and vertical line is ±44°-46°; a diameter of said aeration hole is between 4 and 10 mm; and a distance between two aeration holes is between 100 and 300 mm.

* * * * *